(12) United States Patent
Zurek et al.

(10) Patent No.: US 9,462,257 B2
(45) Date of Patent: Oct. 4, 2016

(54) METHOD AND APPARATUS FOR TWO-DIMENSIONAL TO THREE-DIMENSIONAL IMAGE CONVERSION

(71) Applicant: MOTOROLA MOBILITY LLC, Libertyville, IL (US)

(72) Inventors: Robert A. Zurek, Antioch, IL (US); Timothy Dickinson, Carlsbad, CA (US)

(73) Assignee: Google Technology Holdings LLC, Mountain View, CA (US)

(*) Notice: Subject to any disclaimer, the term of this patent is extended or adjusted under 35 U.S.C. 154(b) by 214 days.

(21) Appl. No.: 14/035,984

(22) Filed: Sep. 25, 2013

(65) Prior Publication Data

US 2014/0267280 A1 Sep. 18, 2014

Related U.S. Application Data

(60) Provisional application No. 61/786,036, filed on Mar. 14, 2013.

(51) Int. Cl.
  *G06T 15/08* (2011.01)
  *H04N 13/02* (2006.01)
  *G06T 7/00* (2006.01)

(52) U.S. Cl.
  CPC ......... *H04N 13/0264* (2013.01); *G06T 7/0075* (2013.01); *G06T 2207/10012* (2013.01); *G06T 2207/20056* (2013.01)

(58) Field of Classification Search
  CPC .......... G06T 2207/10012; G06T 2207/20056; G06T 7/0075; G06T 2200/04; G06T 2207/1028; G06T 7/0069; G06T 2207/20021; G06T 2207/10148; G06T 7/0081; G06T 7/0095; G06T 2207/20144; G06T 2207/20212; G06T 7/0036; G06T 7/0051; G06T 7/206; H04N 13/0264
See application file for complete search history.

(56) References Cited

U.S. PATENT DOCUMENTS

| | | | | |
|---|---|---|---|---|
| 5,231,443 A | * | 7/1993 | Subbarao | G02B 7/38 348/348 |
| 5,305,092 A | * | 4/1994 | Mimura | G01B 11/24 356/609 |
| 5,684,890 A | * | 11/1997 | Miyashita | G06T 7/004 382/154 |
| 6,898,333 B1 | * | 5/2005 | Gopalakrishnan | G06K 9/522 358/1.5 |
| 8,050,507 B2 | | 11/2011 | Chen et al. | |

(Continued)

OTHER PUBLICATIONS

Ko, Jaeseung et al.: "2D-to-3D Stereoscopic Conversion: Depth-Map Estimation in a 2D Single-View Image", Applications of Digital Image Processing XXX, edited by Andrew G. Tescher, Proc. of SPIE vol. 6696, 66962A, 0277-786X/07, doi: 10.1117/12. 736131, Sep. 24, 2007, all pages.

(Continued)

*Primary Examiner* — Sultana M Zalalee
(74) *Attorney, Agent, or Firm* — Troutman Sanders LLP; James E. Schutz; Christopher C. Close, Jr.

(57) ABSTRACT

A method and apparatus provide two-dimensional to three-dimensional image conversion. The apparatus can include an input configured to receive a first image. The apparatus can include a controller configured to segment the first image into a plurality of regions, configured to perform a Fast Fourier Transform on at least one of the regions, and configured to determine a relative horizontal displacement distance between a first frame and a second frame of at least one region based on performing the Fast Fourier Transform.

14 Claims, 11 Drawing Sheets

(56) References Cited

U.S. PATENT DOCUMENTS

| | | | |
|---|---|---|---|
| 8,340,422 B2 | 12/2012 | Boughorbel | |
| 2007/0019883 A1* | 1/2007 | Wong | G06T 7/0069 382/276 |
| 2009/0047010 A1* | 2/2009 | Yoshida | G02B 7/36 396/127 |
| 2009/0304266 A1* | 12/2009 | Aoki | G01C 11/06 382/154 |
| 2010/0080481 A1* | 4/2010 | Chen | G06T 7/0059 382/255 |
| 2011/0026807 A1* | 2/2011 | Wang | H04N 13/0003 382/154 |
| 2011/0074778 A1* | 3/2011 | Turner | H04N 13/026 345/420 |
| 2012/0069004 A1* | 3/2012 | Takama | H04N 13/0022 345/419 |

OTHER PUBLICATIONS

S Bharathi and A Vasuki. Article: 2D-to-3D Conversion of Images Using Edge Information. IJCA Proceedings on International Conference in Recent trends in Computational Methods, Communication and Controls (ICON3C 2012) ICON3C(2):27-32, Apr. 2012. Published by Foundation of Computer Science, New York, USA.

Chung-Feng Jeffrey Kuo and Chin-Hsung Chu, "Improved Auto-Focus Search Algorthms for CMOS Image-Sensing Module", Journal of Information Science and Engineering 27, pp. 1377-1393 (2011).

Shree K. Nayar, et al.: "Real-Time Focus Range Sensor", IEEE Transactions on Pattern Analysis and Machine Intelligence, vol. 18, No. 12, Dec. 1996, pp. 1186-1198.

* cited by examiner

METHOD AND APPARATUS FOR TWO-DIMENSIONAL TO THREE-DIMENSIONAL IMAGE CONVERSION

BACKGROUND

1. Field

The present disclosure is directed to a method and apparatus for two-dimensional to three-dimensional image conversion. More particularly, the present disclosure is directed to converting a two-dimensional image to a three dimensional image by performing a Fast Fourier Transform on at least one region of the image.

2. Introduction

Presently, Three-Dimensional (3D) displays are being developed for user portable electronic devices, such as cellular phones, tablet computers, personal digital assistants, and other user portable electronic devices. These displays will allow users to view 3D content while away from their living room 3D televisions. The users can also take 3D pictures on devices that have 3D stereoscopic cameras.

Unfortunately, to maintain portability and to reduce prices, some user portable electronic devices will have 3D displays, but will have Two-Dimensional (2D) cameras instead of 3D cameras. Thus, users of devices that only have 2D cameras will not be able to enjoy all of the features of their 3D displays when viewing images taken with the 2D cameras. Furthermore, other sources of images, such as e-mail attachments and multimedia messages, may provide 2D images that also cannot employ the full capacity of the 3D displays.

Thus, there is a need for a method and apparatus for two-dimensional to three-dimensional image conversion.

BRIEF DESCRIPTION OF THE DRAWINGS

In order to describe the manner in which advantages and features of the disclosure can be obtained, a description of the disclosure will be rendered by reference to specific embodiments thereof which are illustrated in the appended drawings. These drawings depict only example embodiments of the disclosure and are not therefore to be considered to be limiting of its scope.

DETAILED DESCRIPTION

Embodiments provide a method and apparatus for Two-Dimensional (2D) to Three-Dimensional (3D) image conversion. According to one embodiment, the apparatus can include an input configured to receive a first image. The apparatus can include a controller configured to segment the first image into a plurality of regions, configured to perform a Fast Fourier Transform on at least one of the regions, and configured to determine a relative horizontal displacement distance between a first frame and a second frame of at least one region based on performing the Fast Fourier Transform.

According to another embodiment, a method can include receiving a first image. The method can include segmenting the first image into a plurality of regions. The method can include performing a Fast Fourier Transform on at least one of the regions. The method can include determining a relative horizontal displacement distance between a first frame and a second frame of at least one region based on performing the Fast Fourier Transform.

Figure 1:
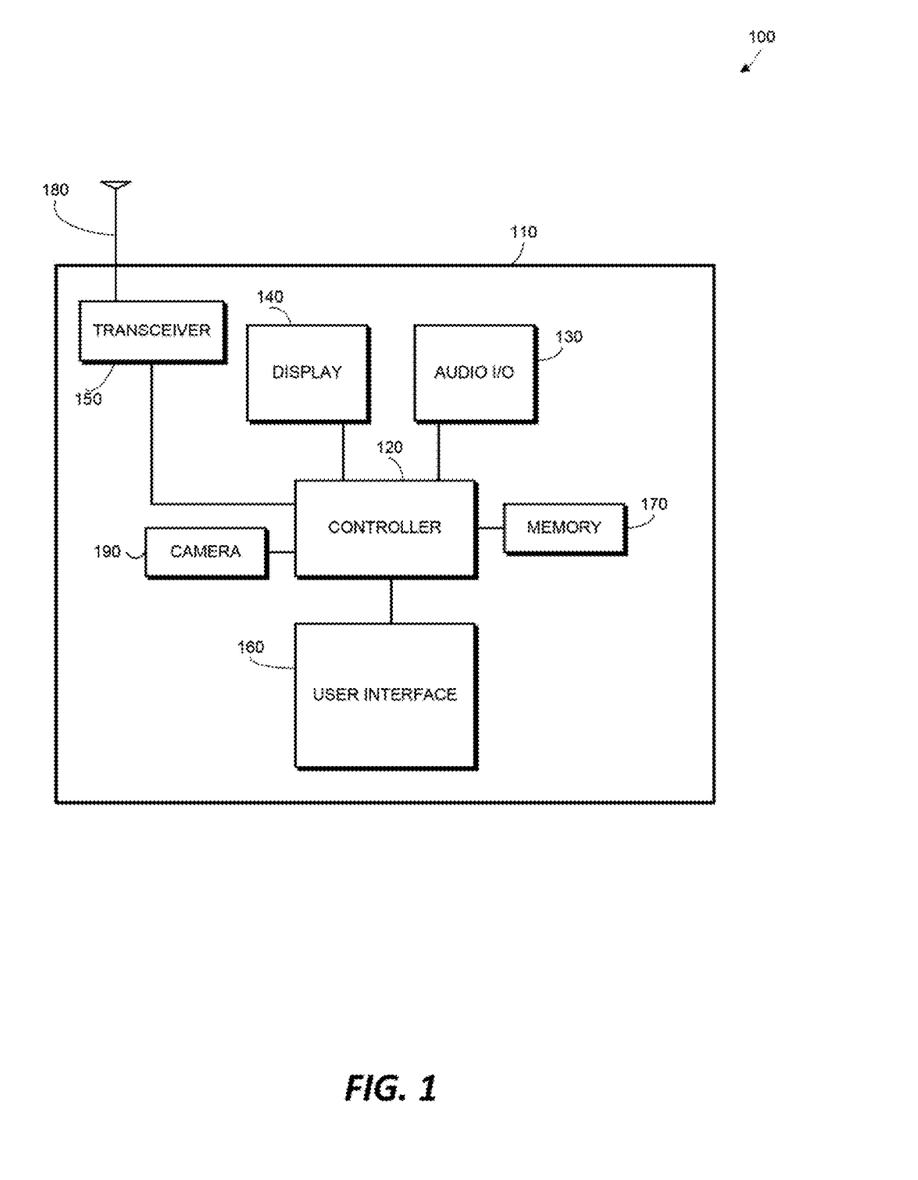
FIG. 1 is an example block diagram of an apparatus according to a possible embodiment.

FIG. 1 is an example block diagram of an apparatus 100 according to a possible embodiment. The apparatus 100 can be a user portable electronic device, a wireless telephone, a cellular telephone, a smartphone, a personal digital assistant, a personal computer, a digital camera, a selective call receiver, a tablet computer, or any other device that is capable of receiving and processing a two-dimensional image. The apparatus 100 can include a housing 110, a controller 120 within the housing 110, audio input and output circuitry 130 coupled to the controller 120, a display 140 coupled to the controller 120, a transceiver 150 coupled to the controller 120, a user interface 160 coupled to the controller 120, a memory 170 coupled to the controller 120, an antenna 180 coupled to the transceiver 150, and a camera 190 coupled to the controller 120.

The display 140 can be a 3D display and can be a liquid crystal display (LCD), a light emitting diode (LED) display, a plasma display, a projection display, a touch screen, an autostereoscopic display such as parallax barrier or lenticular, an anaglyph stereo display, a polarized passive 3d display, an active shutter 3D display, an interference filter 3D display, holographic display, or any other device that displays information. The transceiver 150 may include a transmitter and/or a receiver. The audio input and output circuitry 130 can include a microphone, a speaker, a transducer, or any other audio input and output circuitry. The user interface 160 can include a keypad, buttons, a touch pad, a joystick, a touch screen display, another additional display, or any other device useful for providing an interface between a user and an electronic device. The memory 170 can include a random access memory, a read only memory, an optical memory, a subscriber identity module memory, a solid state memory, a hard drive, a flash memory, removable memory, a cache, or any other memory that can be coupled to a wireless communication device. The apparatus 100 can perform the methods described in all the embodiments.

In operation, the apparatus 100 can receive a first image. For example, the apparatus 100 can capture a two-dimensional image using an input, such as the camera 190, such as a 2D camera. The apparatus can 100 also receive a first image via the transceiver 150, via a removable memory 170, via the user interface 160, or via any other input that can receive a two-dimensional image. The controller 120 can segment the first image into a plurality of regions. The controller 120 can perform a Fast Fourier Transform on at least one of the regions. The controller 120 can determine a relative horizontal displacement distance between a first frame and a second frame of at least one region based on performing the Fast Fourier Transform. The term horizontal can be relative to a user viewing the image, can be relative to the image itself, and can be relative to a display used to display the image. For example, horizontal can be parallel a line between a user's left eye and right eye. Horizontal can also be parallel to perceived horizontal line in the image. The relative horizontal displacement of a region between frames can be a function of a depth of the region determined from the Fast Fourier Transform process.

For example, the first frame of at least one region can be from a region of the originally received image and the second frame of at least one region can be from the same region of the originally received image. Each region can have a first frame from the first image and a copy of the first frame as a second frame that may be horizontally displaced or otherwise processed. Thus, each region can have a first frame from the first image, and a second corresponding frame that can be used to create a second image. The term "image" can refer to an entire image of regions and the term "frame" can differentiate between a given region and a copy of the same region.

The second frame of the at least one region can be displaced by the determined relative horizontal displacement distance between the first frame and the second frame of the region. Alternately, the second frame of the at least one region can be displaced by a portion of the determined relative horizontal displacement distance and the first frame of the same least one region same region can be displaced by a remaining portion of the determined relative horizontal displacement distance.

Figure 2:
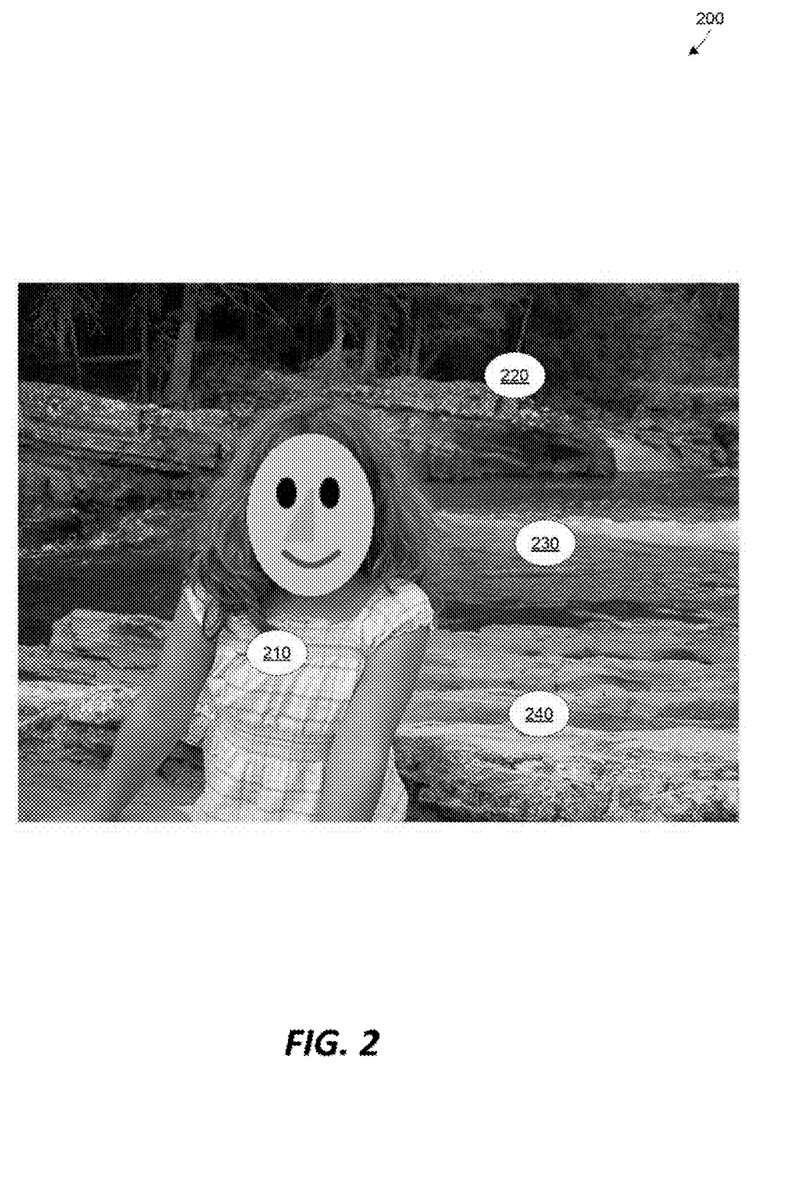
FIG. 2 is an example illustration of a first image according to a possible embodiment.

FIG. 2 is an example illustration of a first image 200, such as the first image received by the apparatus 100, according to a possible embodiment. The first image 200 illustrates possible first frames of at least one region. The first frames of each of the regions can be original frames of regions of the received first image 200. For example, the first image 200 can include a first frame first region 210, a first frame second region 220, a first frame third region 230, and a first frame fourth region 240.

Figure 3:
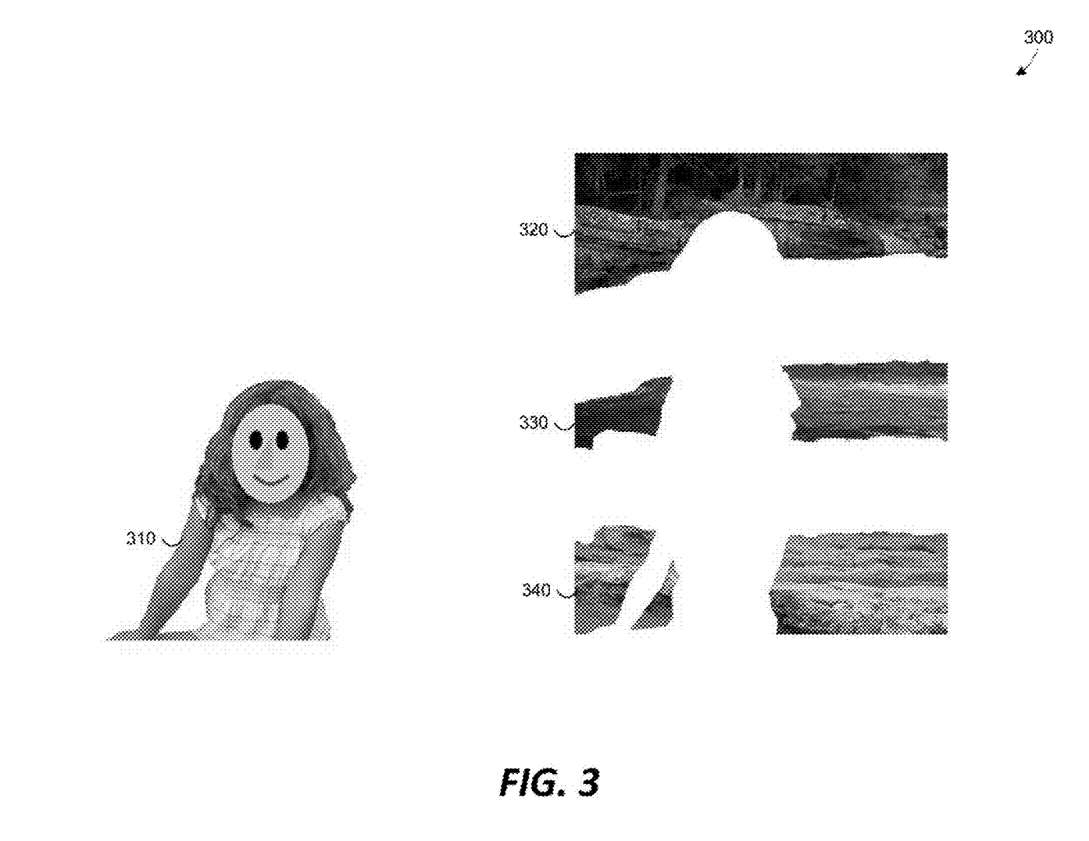
FIG. 3 is an example illustration of second frame regions according to a possible embodiment.

FIG. 3 is an example illustration of second frame regions 300 according to a possible embodiment. The second frame regions 300 illustrate possible second frames of image regions. For example, the second frame regions 300 can include a second frame first region 310, a second frame second region 320, a second frame third region 330, and a second frame fourth region 340.

Referring back to FIG. 1, the controller 120 can perform the Fast Fourier Transform by averaging a plurality of Fast Fourier Transform spectra of the at least one region and by summing high frequency coefficients of the averaged Fast Fourier Transform spectra of the at least one region. The summed average coefficients may have a single scalar value or may have a plurality of values. For example, all of the spectra can be averaged and then then the averaged bins can be summed to average all of certain frequency bins and average other frequency bins to provide average Fast Fourier Transform spectra. According to a possible implementation, performing Fast Fourier Transform can also include averaging the Fast Fourier Transform coefficients in high frequency bands of the at least one region and summing the average Fast Fourier Transform coefficients of the at least one region. High frequency bands can be relative to other frequency bands of a given image region. Averaging the Fast Fourier Transform coefficients in high frequency bands of the at least one region can determine a measure of focus of the region. Summing the average Fast Fourier Transform coefficients of the at least one region can obtain a band power sum of the region.

The controller 120 can determine a depth value of the at least one region based on a ratio of summed high frequency FFT coefficients of a selected region with largest summed high frequency coefficients of at least two regions in a numerator over the summed high frequency FFT coefficients of the at least one region in a denominator. For example, the second frame first region 310 can be the region used for the numerator and second frame second region 320 can be the region used for the denominator. The summed average Fast Fourier Transform coefficients of a selected region with the largest summed average Fast Fourier Transform coefficients can be a band power sum of the highest power region. The summed average Fast Fourier Transform coefficient of the at least one region can be the band power sum of a region of interest. The image region with the largest summed average Fast Fourier Transform coefficient can be a subject of the image, such as a person in a portrait, a building in a landscape, the most in-focus subject in the image, a desired subject of the image, or any other subject of the image. The controller 120 can rank a depth of at the least two regions based on the depth value.

The controller 120 can displace at least one second frame region based on the determined relative horizontal displacement distance. The controller 120 can also generate a second image by combining the second frame regions. The controller 120 can output at least the second image. For example, the display 140 can display the second image or display the first image along with the second image, the memory 170 can store the second image, the transceiver 150 can transmit the second image, and/or the controller 120 can otherwise output the second image.

Figure 4:
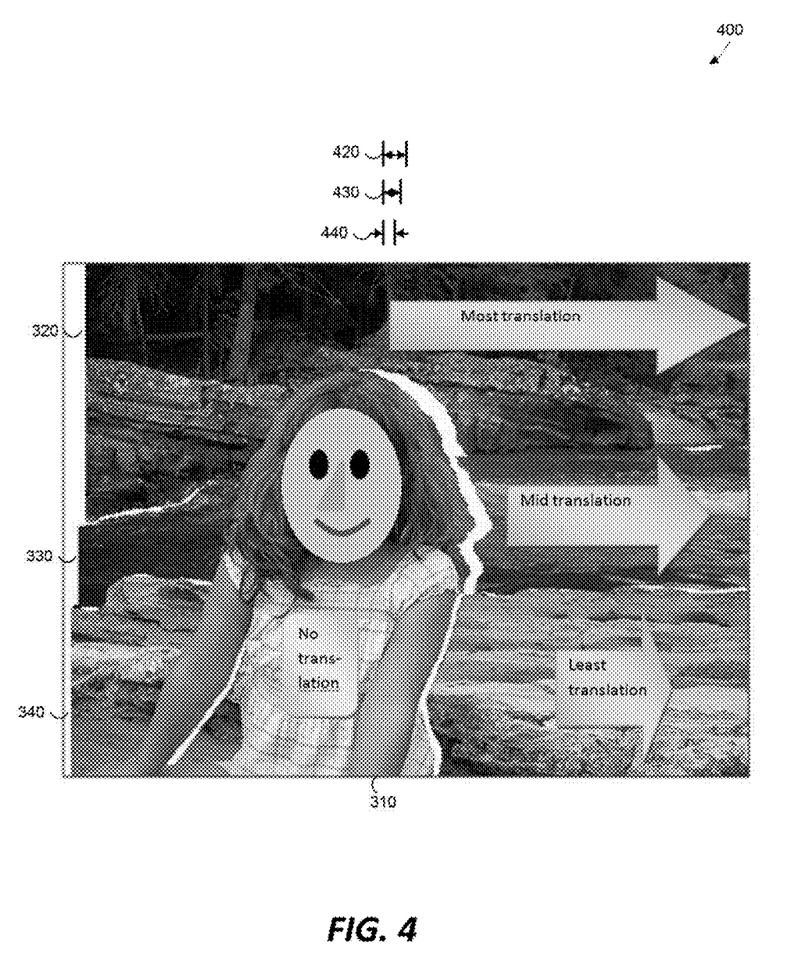
FIG. 4 is an example illustration of a second image according to a possible embodiment.

FIG. 4 is an example illustration of a second image 400 according to a possible embodiment. The second image 400 illustrates possible horizontal displacement distances 420, 430, and 440 and illustrates a possible combination of combined second frame regions. For example, the second image 400 can include the second frame first region 310, the second frame second region 320, the second frame third region 330, and the second frame fourth region 340. The second frame first region 310 may not be horizontally displaced, such as translated or shifted. For example, if the second frame first region 310 is the subject of an image, it may not be horizontally displaced. Alternately the second frame first region 310 may be horizontally displaced according to a desired final image. The second frame second region 320 may be horizontally displaced based on a first determined relative horizontal displacement distance 420. The second frame third region 330 may be horizontally displaced based on a second determined relative horizontal displacement distance 430. The second frame fourth region 340 may be horizontally displaced based on a third determined relative horizontal displacement distance 440.

For example, regions with the largest value of high frequency energy can be the most in focus regions, which in turn can be the closest to the user. A region with the lowest value of high frequency energy can be the most out of focus region which can be the furthest away from the user, such as the furthest back into an image. The region depth and horizontal displacement can be proportional to the inverse of the high frequency energy.

Referring back to FIG. 1, the controller 120 can create a stereoscopic image by combining the first frame and the second frame of each of the regions. For example, a first image can include the plurality of first frame regions and a second image can include at least some of horizontally displaced regions. The first image including the plurality of first frame regions and the second image including the plurality of second frame regions can be combined to create the stereoscopic image. The combination of each two frames of each region can create an image in a stereoscopic format such as a side-by-side format with one frame corresponding to a left frame and the other frame corresponding to a right frame, a checkerboard format, a top-bottom format, a multipart object format, an interleaved format, a column alternation format, a row alternation format, or any other stereoscopic format.

Figure 5:
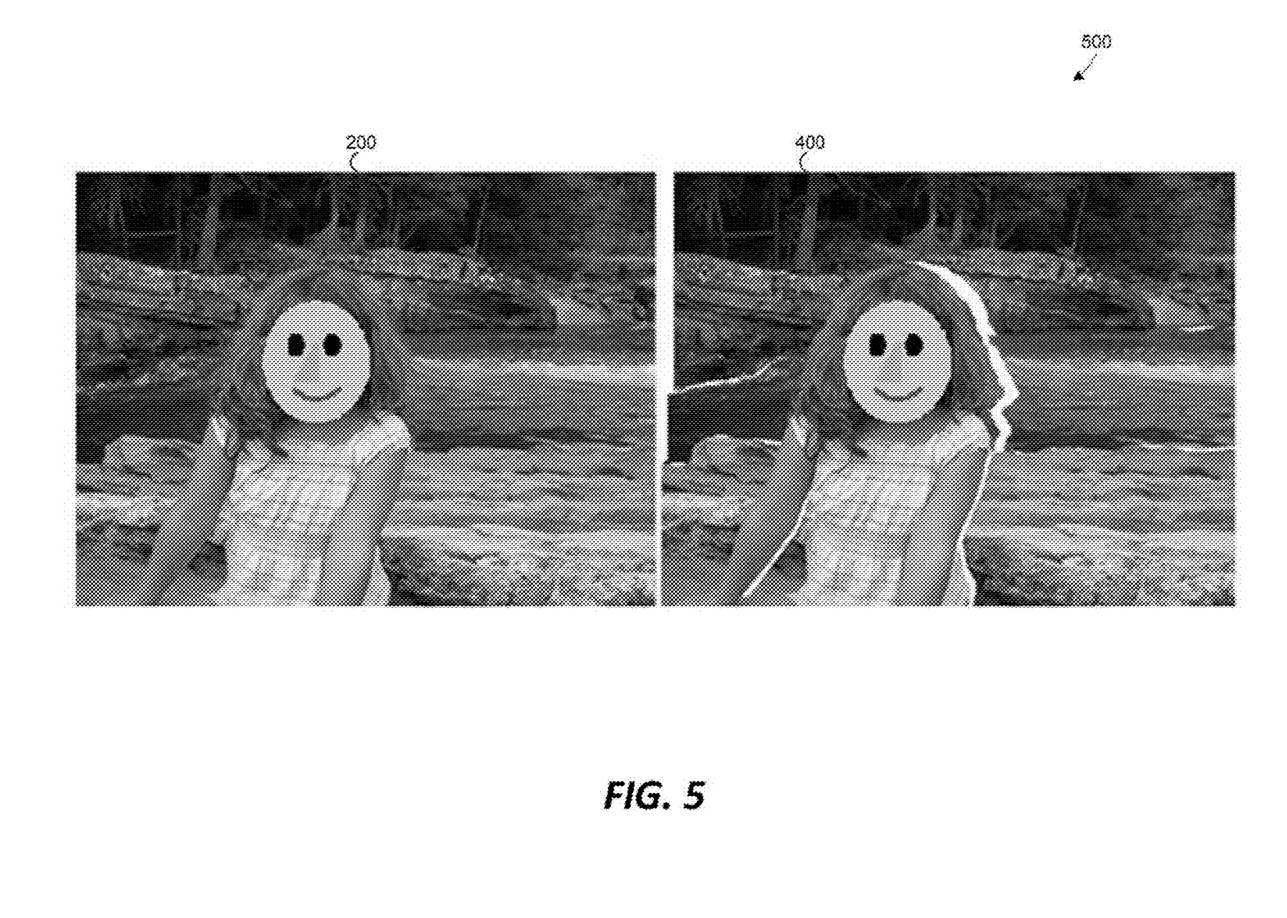
FIG. 5 is an example illustration of a stereoscopic image according to a possible embodiment.

FIG. 5 is an example illustration of a stereoscopic image 500 according to a possible embodiment. The stereoscopic image 500 illustrates a possible stereoscopic image created by the controller 120. The stereoscopic image 500 can include the first image 200 and the second image 400.

Referring back to FIG. 1, the controller 120 can receive a user input to adjust a depth of an adjustment region and can adjust the depth ranking of the adjustment region based on the user input. For example, a user can modify the depth of a stereoscopic image generated based on the first image and the second image. The user interface 160 of the device can have controls for turning on and off the 3D rendering as well as controls for the depth of the subject in front of or behind the screen and the overall extent of the depth of the image, such as by using depth and extension sliders.

Figure 6:
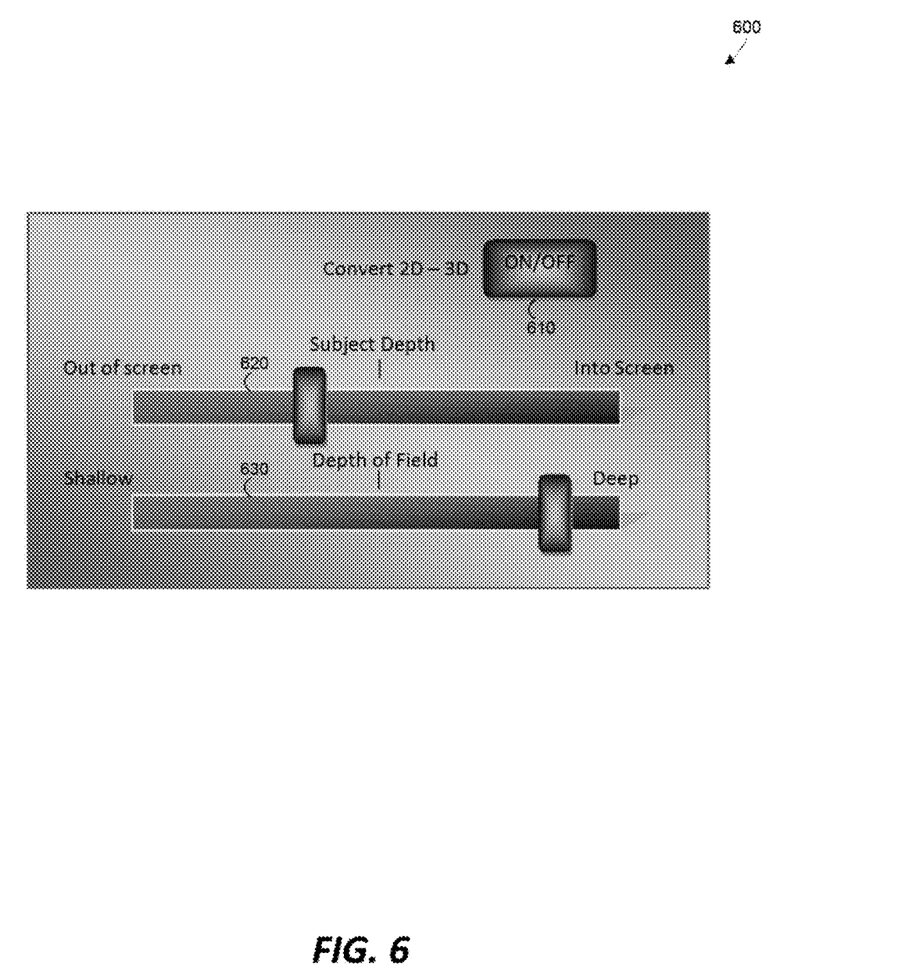
FIG. 6 is an example illustration of a user interface according to a possible embodiment.

FIG. 6 is an example illustration of a user interface 600 according to a possible embodiment. The user interface 600 illustrates a possible interface for adjusting depths of regions. For example, the user interface can include a 2D-to-3D conversion button 610, a subject depth slider 620, and a depth of field slider 630. The 2D-to-3D conversion button 610 can enable 2D-to-3D conversion of an image and/or can toggle between displaying the 3D image and the 2D image after conversion. The subject depth slider 620 can adjust an image subject depth from out of screen, such as out of the display 140, to into the screen, such as into the display 140. The depth of field slider 630 can adjust a depth of field of an image from shallow to deep. Moving the depth of field slider 630 towards "deep" can cause a difference in depth between the furthest forward and furthest rearward regions to increase or stretch. Moving this depth of field slider 630 towards "shallow" can cause the difference in depth between the furthest forward and furthest rearward regions to decrease or compress.

Referring back to FIG. 1, the controller 120 can also perform a Fast Fourier Transform on a first portion of the at least one region, can perform a Fast Fourier Transform on a second portion of the at least one region, and can ascertain a tilt of the at least one region from the first portion to the second portion. The tilt of the region can be a depth relative to a plane parallel to the height and width of the received image. For example, a depth and tilt of region can be ascertained by performing spatial Fast Fourier Transform in two or more, such as three-to-five, preset areas of the region. The overall depth of the region can be an average of the three-to-five depths with the tilt being the angle of the surface created though the three-to-five areas relative to the screen or reference plane. A two or more, three or more, or at least five-position Fast Fourier Transform can allow for the estimation of nonlinear, such as curved, surfaces to be rendered. The controller 120 can adjust a perceived tilt of the at least one region based on the ascertained tilt.

Figure 7:
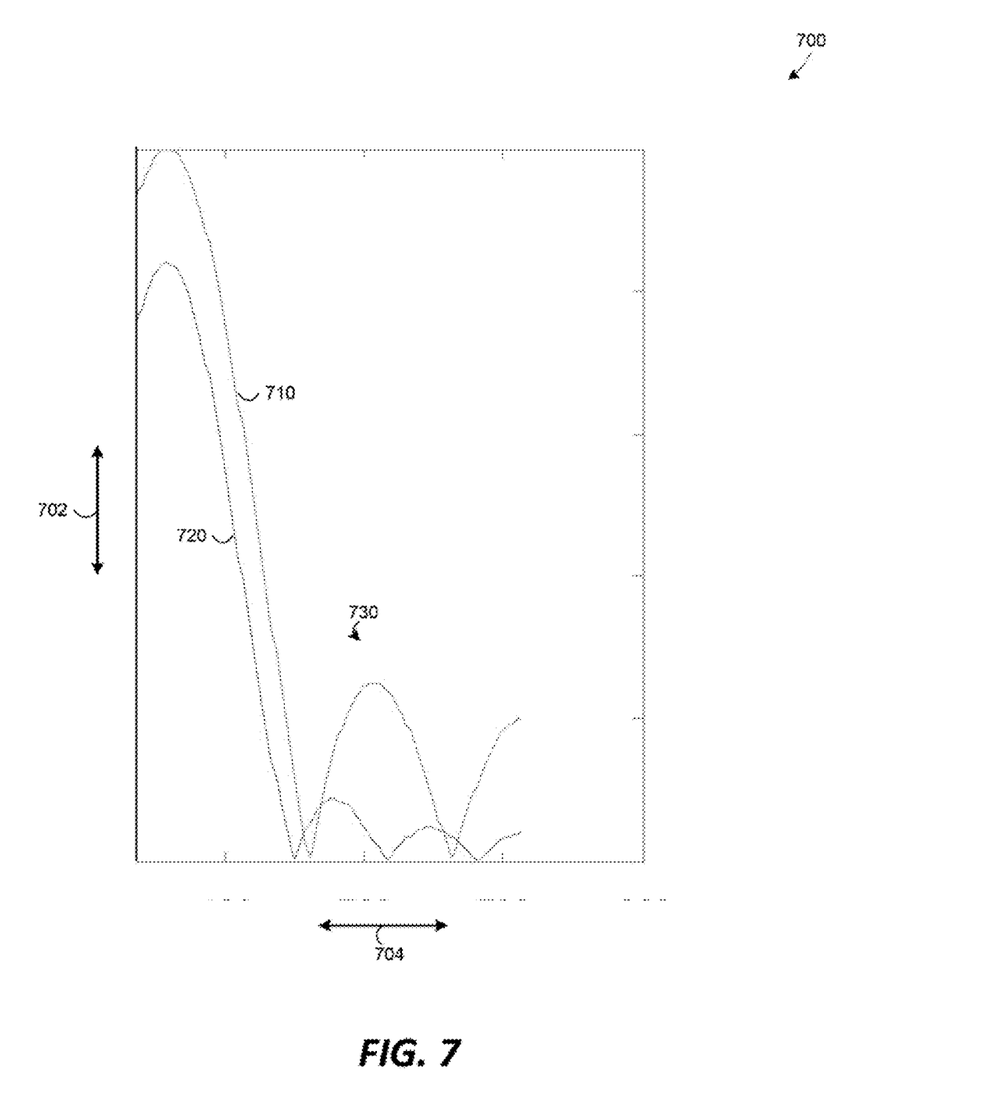
FIG. 7 is an example graph showing Fast Fourier Transform amplitude with respect to frequency according to a possible embodiment.

FIG. 7 is an example graph 700 showing Fast Fourier Transform amplitude 702 with respect to frequency 704 according to a possible embodiment. The graph 700 illustrates average Fast Fourier Transform amplitudes for a first region 710 and average Fast Fourier Transform amplitudes for a second region 720. The graph 700 also illustrates the upper bands 730 of the average Fast Fourier Transform values that can be summed up to determine a measure of focus of a given region.

Figure 8:
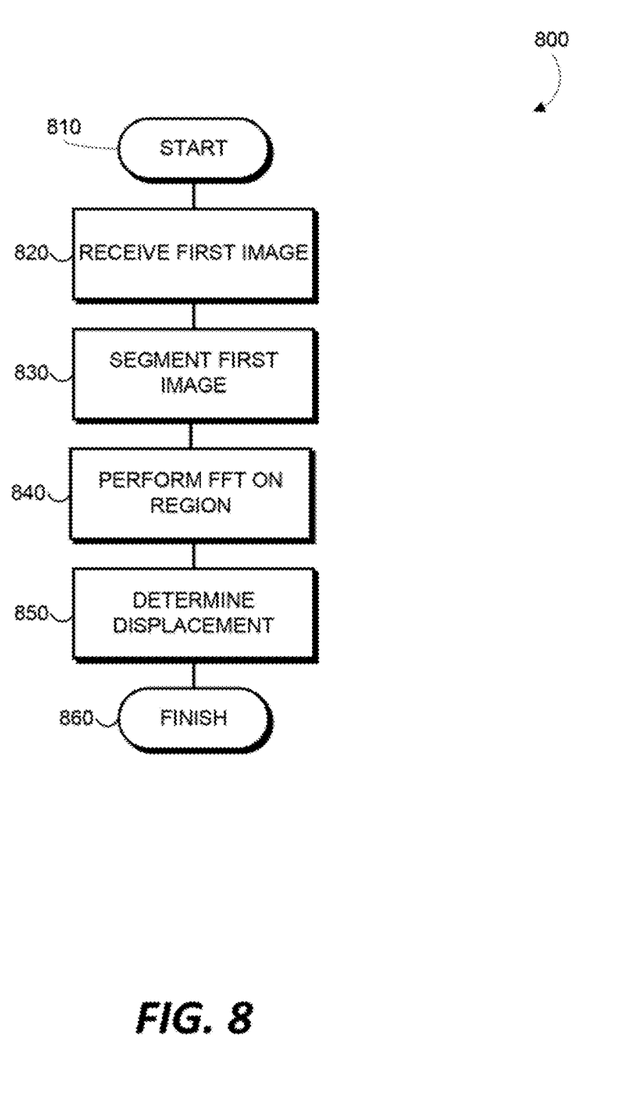
FIG. 8 is an example flowchart illustrating the operation of the apparatus according to a possible embodiment.

FIG. 8 is an example flowchart 800 illustrating the operation of the apparatus 100 according to a possible embodiment. At 810, the flowchart can begin. At 820, the flowchart 800 includes receiving a first image. At 830, the flowchart 800 includes segmenting the first image into a plurality of regions.

At 840, the flowchart 800 includes performing a Fast Fourier Transform on at least one of the regions. Performing Fast Fourier Transform can include averaging a plurality of Fast Fourier Transform spectra of the at least one region and can include summing high frequency coefficients of the averaged Fast Fourier Transform spectra of the at least one region. Performing Fast Fourier Transform can also include determining a depth value of the at least one region based on a ratio of summed high frequency coefficients of a selected region with largest summed high frequency coefficients of at least two regions over the summed high frequency coefficients of the at least one region. Performing Fast Fourier Transform can also include ranking a depth of at the least two regions based on the depth value.

At 850, the flowchart 800 includes determining a relative horizontal displacement distance between a first frame and a second frame of at least one region based on performing the Fast Fourier Transform. The relative horizontal displacement of a region between frames can be a function of a depth of the region determined from the Fast Fourier Transform process. The first frames of each of the regions can be original frames of regions of the received image. At 860, the flowchart 800 can end.

Figure 9:
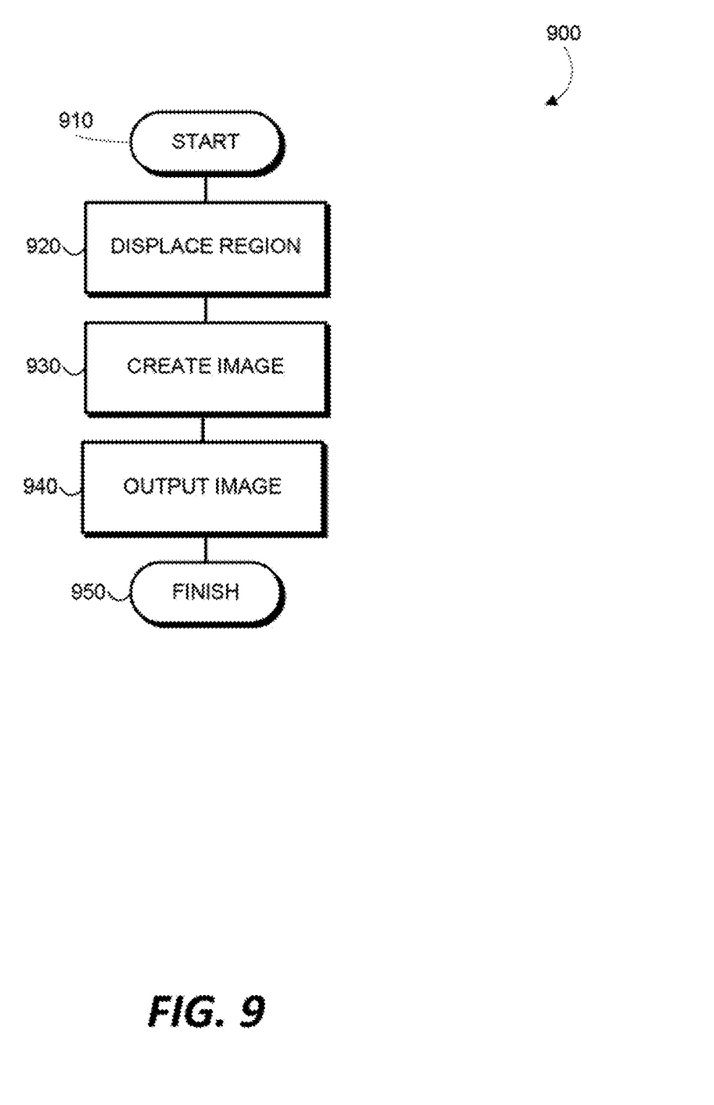
FIG. 9 is an example flowchart illustrating the operation of the apparatus according to a possible embodiment.

FIG. 9 is an example flowchart 900 illustrating the operation of the apparatus 100 according to a possible embodiment. Elements of the flowchart 900 can be combined with elements of the flowchart 800. At 910, the flowchart 900 can begin. At 920, the flowchart 900 includes displacing at least one region of the second frame based on the determined relative horizontal displacement distance. At 930, the flowchart 900 includes creating an image. For example, a second image can be generated by combining the regions of the second frame. Also, a stereoscopic image can be created by combining the first frame and the second frame of each of the regions. Furthermore, the stereoscopic image can be created by combining the first image and the second image.

At 940, the flowchart 900 includes outputting at least the second image. For example, outputting at least the second image can include displaying the second image, displaying the second image with the first image, storing the second image into a memory or storage device, transmitting the second image, and/or otherwise outputting the second image. At 950, the flowchart 900 can end.

Figure 10:
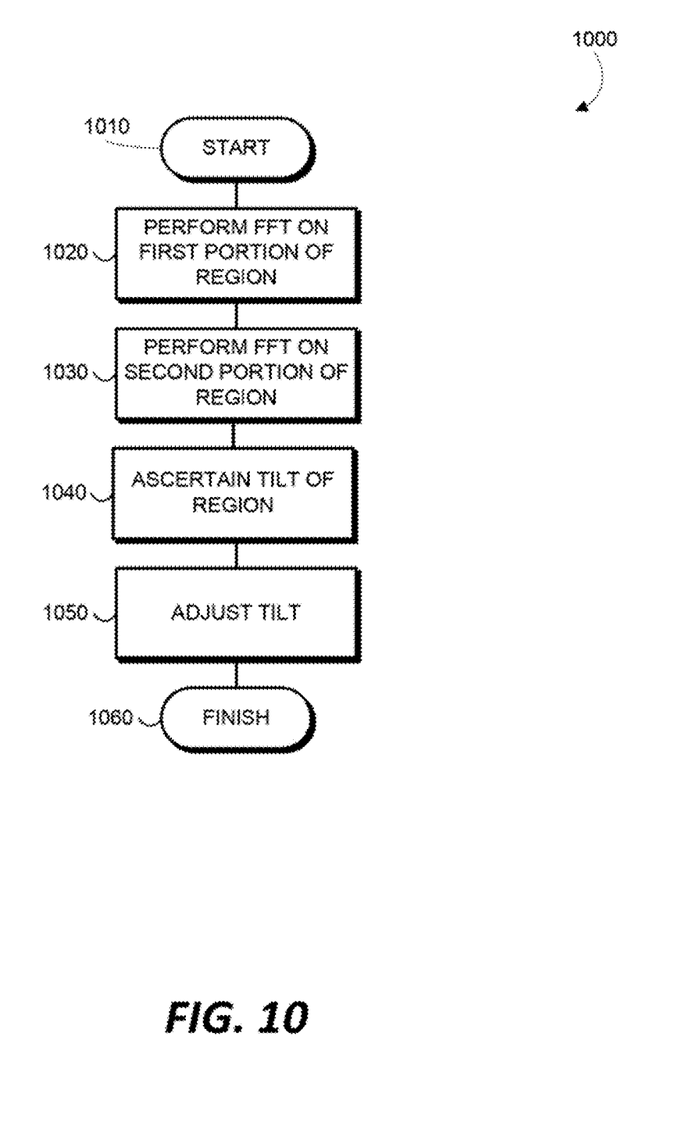
FIG. 10 is an example flowchart illustrating the operation of the apparatus according to a possible embodiment.

FIG. 10 is an example flowchart 1000 illustrating the operation of the apparatus 100 according to a possible embodiment. Elements of the flowchart 1000 can be combined with elements of the flowchart 800. At 1010, the flowchart can begin. At 1020, the flowchart can include performing a Fast Fourier Transform on a first portion of the at least one region. At 1030, the flowchart can include performing a Fast Fourier Transform on a second portion of the at least one region. At 1040, the flowchart can include ascertaining a tilt of the at least one region from the first portion to the second portion. The tilt of the region can be a depth relative to a plane parallel to the height and width of the received image. At 1050, the flowchart can include adjusting a perceived tilt of the at least one region based on the ascertained tilt. At 1060, the flowchart 1000 can end. The image processing involved in creating the perceived tilt can be accomplished via a variable displacement across a region. For example one side of a tilted region can have one amount of horizontal displacement, while the other side can have more or less displacement depending on whether it is farther away or closer to the screen plane. The pixels across the regions can be displaced by an interpolated amount. The interpolation can be linear to represent a flat tilted surface or can be nonlinear to represent a concave or convex surface.

Figure 11:
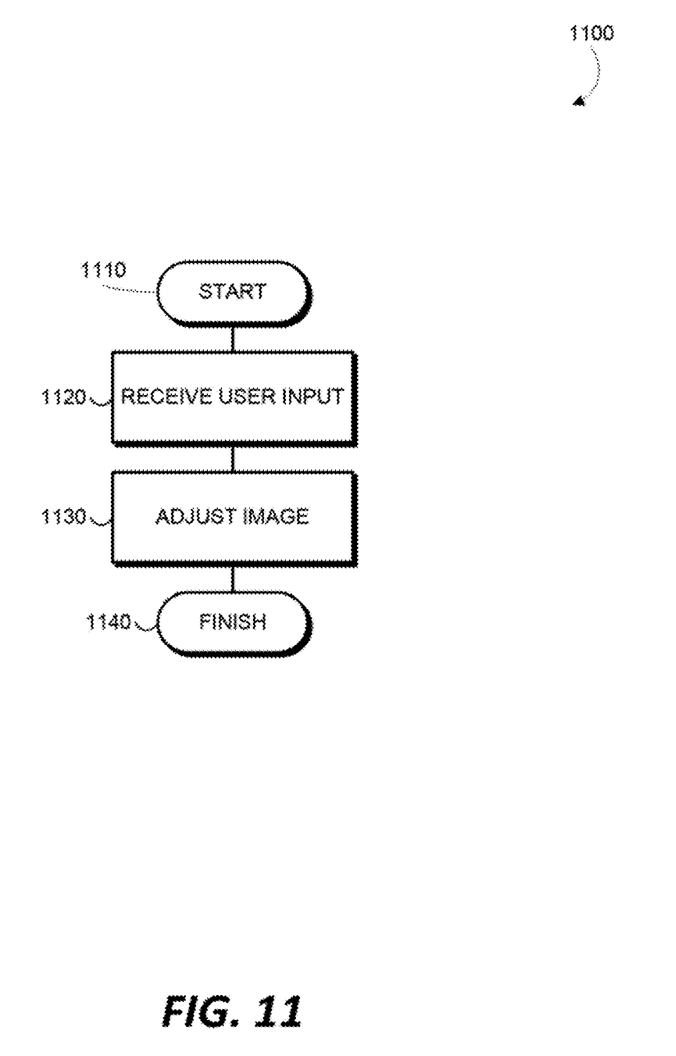
FIG. 11 is an example flowchart illustrating the operation of the apparatus according to a possible embodiment.

FIG. 11 is an example flowchart 1100 illustrating the operation of the apparatus 100 according to a possible embodiment. Elements of the flowchart 1100 can be combined with elements of the flowchart 800. At 1110, the flowchart can begin. At 1120, the flowchart 1100 can include receiving a user input to adjust a depth of an adjustment region. At 1130, the flowchart 1100 can include adjusting the depth ranking of the adjustment region based on the user input. At 1140, the flowchart 1100 can end.

Embodiments can provide for a method and apparatus to create 3D visual content from a 2D image. The 2D image can be segmented into regions using edge detection methods, such as by selecting image regions based on edge detection. According to some embodiments a depth of each region can be calculated using one or more spatial Fast Fourier Transforms. For example, the depth of a region can be determined by determining high frequency content of a spatial Fast Fourier Transform for each region and by comparing it to a most in focus region, such as a subject of the image. At least one region can be horizontally translated, such as shifted, left or right based on the calculated depth. In a case where a subject of the image is moved in front of or behind the display screen, a spatial shift can be applied to the subject region in the second image and all of the non-subject regions can be shifted relative to the shift applied to the subject region. Blank regions created from shifting the at least one region can be filled. For example, an interpolation algorithm can be applied to blank regions created by the shifting and Gaussian blur can be applied to the newly interpolated region. Thus, regions of the original image can be displaced horizontally by calculated distances and resulting gaps can be filled. The resulting shifted region image can be combined with the original image to produce a 3D image.

According to some embodiments, a second image can be created with a subject region unaltered, and displacement shift can be applied to non-subject regions as a function of the relative focus or relative depth and tilt of the other regions relative to the subject region while taking into consideration a user 3D depth extension setting, if applicable. The subject region of the segmented regions can be automatically detected or a user can select which region is the subject region. According to some embodiments, the method can be performed by a user portable device with a 3D display and a 2D-to-3D converter. For example, regions of a photo can be created and a spatial Fast Fourier Transform can be performed over each region to create a stereoscopic image.

The method of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" followed by a list is defined to mean at least one of, but not necessarily all of, the elements in the list. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
    receiving a first image;
    segmenting the first image into a plurality of regions, each region of the first image comprising a frame;
    performing, on a first region of the plurality of regions, the first region comprising a first frame, a Fast Fourier Transform that comprises summing high frequency coefficients of averaged Fast Fourier Transform spectra of the first region to provide a summed high frequency coefficient of the first region;
    determining, from the summed high frequency coefficient of the first region and a summed high frequency coefficient of a second region, a largest summed high frequency coefficient;
    using a ratio of the largest summed high frequency coefficient to the summed high frequency coefficient of the first region, determining a horizontal displacement distance for the first region;
    generating a second image, the second image also comprising the plurality of regions, wherein a first region of the second image corresponds to the first region of the first image, and wherein the first region of the second image comprises a second frame, the second frame being a copy of the first frame displaced by the determined horizontal shift; and creating a stereoscopic image by combining the first frame and the second frame.

2. The method according to claim 1, wherein the frames of each region of the first image are original frames the plurality of regions of the first image.

3. The method according to claim 1, further comprising:
performing a Fast Fourier Transform on a first portion of the first region;
performing a Fast Fourier Transform on a second portion of the first region; and
ascertaining a tilt of the first region from the first portion to the second portion.

4. The method according to claim 3, wherein the tilt of the first region is a depth relative to a plane parallel to the height and width of the first image.

5. The method according to claim 3, further comprising:
adjusting a perceived tilt of the first region based on the ascertained tilt.

6. The method according to claim 1, further comprising:
receiving a user input to adjust a depth of an adjustment region; and
adjusting a depth ranking of the adjustment region based on the user input.

7. The method according to claim 1, wherein the horizontal displacement distance for the first region is a function of a depth of the first region determined from the Fast Fourier Transform process.

8. An apparatus comprising:
an input for receiving images;
a controller; and
a non-transitory storage medium storing instructions that, when executed by the controller, cause the apparatus to:
receive a first image;
segment the first image into a plurality of regions, each region of the first image comprising a frame;
perform, on a first region of the plurality of regions, the first region comprising a first frame, a Fast Fourier Transform that comprises summing high frequency coefficients of averaged Fast Fourier Transform spectra of the first region to provide a summed high frequency coefficient of the first region;
determine, from the summed high frequency coefficient of the first region and a summed high frequency coefficient of a second region, a largest summed high frequency coefficient;
use an a ratio of the largest summed high frequency coefficient to the summed high frequency coefficient of the first region to determine a horizontal displacement distance for the first region;
generate a second image, the second image also comprising the plurality of regions, wherein a first region of the second image corresponds to the first region of the first image, and wherein the first region of the second image comprises a second frame, the second frame being a copy of the first frame displaced by the determined horizontal shift; and
create a stereoscopic image by combining the first frame and the second frame.

9. The apparatus according to claim 8, wherein the frames of each region of the first image are original frames the plurality of regions of the first image.

10. The apparatus according to claim 8, wherein the non-transitory storage medium further stores instructions that, when executed by the processor, cause the apparatus to
perform a Fast Fourier Transform on a first portion of the first region;
perform a Fast Fourier Transform on a second portion of the first region; and
ascertain a tilt of the first region from the first portion to the second portion.

11. The apparatus according to claim 10, wherein the tilt of the first region is a depth relative to a plane parallel to the height and width of the first image.

12. The apparatus according to claim 10, wherein the non-transitory storage medium further stores instructions that, when executed by the processor, cause the apparatus to adjust a perceived tilt of the first region based on the ascertained tilt.

13. The apparatus according to claim 8, wherein the non-transitory storage medium further stores instructions that, when executed by the processor, cause the apparatus to:
receive a user input to adjust a depth of an adjustment region; and
adjust a depth ranking of the adjustment region based on the user input.

14. The apparatus according to claim 8, wherein the horizontal displacement distance for the first region is a function of a depth of the first region determined from the Fast Fourier Transform process.

* * * * *

UNITED STATES PATENT AND TRADEMARK OFFICE
CERTIFICATE OF CORRECTION

PATENT NO. : 9,462,257 B2
APPLICATION NO. : 14/035984
DATED : October 4, 2016
INVENTOR(S) : Robert A. Zurek et al.

It is certified that error appears in the above-identified patent and that said Letters Patent is hereby corrected as shown below:

In the Claims

In column 8, line 47, cancel the text from Claim 1 beginning "performing, on a first region" to and ending "frequency coefficient" in column 8, line 56, and insert the following:

--performing, on a first region of the plurality of regions, the first region comprising a first frame, a Fast Fourier Transform that comprises summing high frequency coefficients from an upper band of averaged Fast Fourier Transform spectra of the first region to provide a summed high frequency coefficient of the first region, the high frequency coefficient being indicative of a measure of focus of the first region;
determining, from the summed high frequency coefficient of the first region and a summed high frequency coefficient of a second region, a largest summed high frequency coefficient, wherein the summed high frequency coefficient of the second region is provided by performing, on the second region, a Fast Fourier Transform that comprises summing high frequency coefficients from an upper band of averaged Fast Fourier Transform spectra of the second region;--

In column 9, line 36, cancel the text from Claim 8 beginning "perform, on a first region" to and ending "frequency coefficient" in column 9, line 45, and insert the following:

--perform, on a on a first region of the plurality of regions, the first region comprising a first frame, a Fast Fourier Transform that comprises summing high frequency coefficients from an upper band of averaged Fast Fourier Transform spectra of the first region to provide a summed high frequency coefficient of the first region, the high frequency coefficient being indicative of a measure of focus of the first region;
determine, from the summed high frequency coefficient of the first region and a summed high frequency coefficient of a second region, a largest summed high frequency coefficient, wherein the summed high frequency coefficient of the second region is provided by performing, on the second region, a Fast Fourier Transform that comprises summing high frequency coefficients from an upper band of averaged Fast Fourier Transform spectra of the second region;--

Signed and Sealed this
Twenty-ninth Day of November, 2016

Michelle K. Lee
*Director of the United States Patent and Trademark Office*